United States Patent
Okuno et al.

[15] 3,666,809

[45] May 30, 1972

[54] METHOD FOR THE PRODUCTION OF ACRYLAMIDE CRYSTALS

[72] Inventors: Kenzo Okuno, Tokyo; Takaharu Itagaki, Kitakyushu; Yoshimasa Isogai, Tokyo; Kazuo Yoshida, Kitakyushu; Konosuke Fujiki, Kitakyushu; Katumi Odagawa, Kitakyushu, all of Japan

[73] Assignee: Mitsubishi Chemical Industries Limited, Tokyo, Japan

[22] Filed: Sept. 25, 1970

[21] Appl. No.: 75,692

[30] Foreign Application Priority Data

Oct. 8, 1969 Japan..................................44/80543
Oct. 8, 1969 Japan..................................44/80544
Oct. 8, 1969 Japan..................................44/80545

[52] U.S. Cl. .......................................................260/561 N
[51] Int. Cl. ..........................................................C07c 103/00
[58] Field of Search ..............................................260/561 N

[56] References Cited

UNITED STATES PATENTS 2,186,976  1/1940  Junkmann et al......................260/561
3,499,879  3/1970  Kobayashi ...........................260/88.7

*Primary Examiner*—Lewis Gotts
*Assistant Examiner*—Ethel G. Love
*Attorney*—Oblon, Fisher & Spivak

[57] ABSTRACT

A method for the production of acrylamide crystals, characterized in preparing acrylamide crystals from an aqueous acrylamide solution, which contains at least one kind of surfactant selected from the group consisting of a cellulose glycolic acid salt and polyoxyethylene alkyl amine- and polyoxyethylene alkyl amide-type surfactants. The resulting acrylamide crystals are of higher purity, having less susceptibility to being concreted.

7 Claims, No Drawings

METHOD FOR THE PRODUCTION OF ACRYLAMIDE CRYSTALS

The invention relates to a method for the production of acrylamide crystals and more particularly to a method for the preparation of acrylamide crystals having improved properties from an aqueous acrylamide solution.

Acrylamide is extensively used in industries, particularly as a raw material from which flocculating agent or paper-strengthening agent is prepared.

The conventional method in prior art for the production of acrylamide crystals comprises hydrating acrylonitrile by use of sulphuric acid as catalyst to produce acrylamide sulphate, subjecting the resulting acrylamide sulphate to neutralization employing ammonia or alkali to form free acrylamide, and filtering the major portion of ammonium sulphate or alkali sulphate resulting from the said neutralization in a suitable manner to obtain an acrylamide solution thereby from which solid acrylamide is prepared in the form of crystals to be dried for practical uses.

Acrylamide crystals thus prepared by the conventional method normally are in the form of small flake or a massive material consisting of small flakes overlapping one another. Thus, the conventional method involves disadvantages as follows.

First of all, difficulty has been experienced in removing such sulphate as ammonium sulphate or alkali sulphate and organic impurities from the mother liquor with the result that a massive material consisting of laminar or flaky acrylamide crystals retains an appreciable amount of the mother liquor between individual flakes which cannot be completely removed even by means of a powerful centrifugal separator. In consequence, acrylamide crystals when supplied for practical applications have contained a substantial amount of impurities.

Secondly, the flaky crystals or the massive material consisting of such crystals overlapping one another is crumbly and friable, and when subjected to filtration or drying following the crystallization step, the crystals are liable to split into small pieces or particles whereby making for concretion of the crystals under transportation or storage to a solid lump.

As acrylamide crystal belongs to the monoclinic crystal system of poor symmetry and possesses a good affinity with water which serves as solvent in the crystallization of acrylamide, the form of acrylamide crystals available in the past has been limited to that of small pieces or an agglomeration, regardless of any set of crystallization conditions. Hence, acrylamide crystals produced by the conventional method normally have been subjected to additional treatments before employment which comprise purification of the crystals through the medium of recrystallization using a solvent, washing and drying. Apparently, such treatments bring about a reduced yield of acrylamide, while the requirement of solvent necessitates various installations for supply, recovery and purification thereof, leading to a higher production cost of acrylamide crystals.

In an attempt to mitigate such disadvantages by improving the shape of acrylamide crystals, it has been proposed to employ a small amount of surfactant in preparing aqueous acrylamide solution to thereby form acrylamide crystals of a prismatic shape through the medium of crystallization.

In fact, the crystals having a prismatic shape are rather readily filtered off from the mother liquor, while getting wet with the mother liquor to a less degree, so that acrylamide crystals having a less content of impurities are obtained.

This, however, has been only a partial solution of the problems, and the concretion problem has remained unsolved in that even with the prismatic shape, acrylamide crystal still tends to split into small pieces or particles of a smaller diameter in the course of centrifugal separation and drying which follow crystallization step whereby giving rise to concretion of crystals, unless the crystal takes a thick shape rather than slender one.

Accordingly, an object of the invention is to provide a method for the production of acrylamide crystals of higher purity in which extraneous steps are dispensed with.

Another object of the invention is to provide a method for the production of acrylamide crystals which are difficult to concrete during storage or transportation.

These and other objectives of the invention are accomplished by crystallizing acrylamide out of an aqueous medium, which contains at least one kind of surfactant selected from the group consisting of a cellulose glycolic acid salt and polyoxyethylene alkyl amine and polyoxyethylene alkyl amide type surfactants.

We have discovered that in order to avoid such concretion, it is needful for acrylamide crystals to satisfy the three requirements mentioned as follows, in addition to the possession of a stereoscopic or cubic shape.

1. The ratio of length to mean diameter is more than 1 to less than 3.
2. The mean diameter is more than 0.4 mm, preferably more than 1 mm.
3. The "concretion index" of crystals is less than 5.

The "concretion index" referred to in this specification was designed to establish a criterion of susceptibility to being concreted which was determined by the method as illustrated later.

The term "length" means the lengthwise measurement of a crystal from end to end; and the term "mean diameter" means the measurement of the diameter of a crystal in its cross section assumed as a circle — for example, mean diameter of 1 mm signifies that the cross-sectional area is equivalent to that of a circle having diameter of 1 mm.

The method for determining the "concretion index" comprises:

Acrylamide crystals were spread about 5 mm deep over the flat bottom of a vat for vacuum drying at 40° C. for 1 hour, so that the acrylamide crystals contained about 1 to 2 percent water; 200 g of the acrylamide crystals were placed in a cylindrical vessel having a 75 mm diameter and a 100 mm height, and said vessel was placed in a conventional desiccator employing concentrated sulphuric acid as drying agent; the compression moulding of the resulting acrylamide crystals was carried out at 30° C. by applying a 5 kg load thereon for 20 hours; and the resulting cylindrical moulding was burdened on the upper surface thereof having a 75 mm diameter with a minimal, compressive load needed to break the moulding to thereby obtain a concretion index, which is equivalent to the absolute value of said load in terms of kg.

The invention provides a method for the production of acrylamide crystals which satisfy the aforesaid three requirements.

Even in the case where the major portion of crystals meets the three requirements, normally crystals tend to concrete to form a solid lump, if crystals passing through a 100 mesh Tyler screen account for more than 5 percent. Thus, it is desirable to provide crystals of uniform size. This requirement is also met with our method.

No particular limitations are imposed upon the aqueous acrylamide solution used for crystallization operation, which is carried out in the presence of surfactant according to our invention. The aqueous acrylamide solution, which is prepared by a process comprising hydrating acrylonitrile by use of sulphuric acid as catalyst, neutralising the resulting hydrate with ammonia or alkali to form sulphate and then removing a major portion of the sulphate from the mother liquor may be directly used for the method of the invention, without being affected either by the sulphate or by reaction by-products as for example nitrilotripropionamide and acrylic acid contained in the aqueous solution. Further, the method of the invention is applicable to the purification of acrylamide through the medium of recrystallization in water.

The method of the invention may be carried out in various modes. In the batch process a quantity of surfactant is added to an aqueous acrylamide solution for dissolution and acrylamide is then crystallized out of the solution, whereas in the continuous process a quantity of surfactant is added to the reaction liquor at any one of stages preceding the crystallization step, said quantity being such that a suitable concentration of surfactant is reached when the crystallization is effected. In the latter case where the mother liquor is allowed to circulate through the reaction system, no fresh feed of surfactant is needful excepting for the compensation of a loss thereof incurred in the circulation of the mother liquor.

Regarding the surfactants employed in our method, any one kind of surfactant selected from the group consisting of the aforesaid cellulose glycolic acid salt and polyoxyethylene alkyl amine and polyoxyethylene alkyl amide type surfactants may be used individually to yield acrylamide crystals having improved properties, which satisfy the aforesaid requirements. It will be noted, however, that the effectiveness of individual surfactants is not necessarily the same but varies with the type thereof. For example, generally cellulose glycolic acid salt has a strong tendency to increase the thickness of the crystals.

We have discovered that five types of surfactants, that is, polyoxyethylene sorbitan alkyl ester, polyoxyethylene alkyl ester, polyoxyethylene alkyl ether, polypropyleneglycol polyethyleneglycol ether and polypropyleneglycol type surfactants possess a strong tendency to increase the length of acrylamide crystal, and that the employment for the crystallization of acrylamide of cellulose glycolic acid salt together with at least one of said five types of surfactant results in acrylamide crystals of good quality.

Adequate effect may be produced by the employment of any one kind of the aforesaid surfactants in an amount corresponding to a concentration of from 5 to 1,000 ppm, preferably from 10 to 500 ppm in relation to aqueous acrylamide solution, said concentration being applied to each of two or more types of surfactant employed in combination, if such is the case.

The shape of acrylamide crystals may be modified by altering the mutual proportion of two or more kinds of surfactants used in combination.

Preferably, anti-foaming agent such as silicone oil is employed in carrying out the process of the invention, since a surfactant is apt to foam a solution.

The method of the invention is applicable to the crystallization operation which is carried out in various modes. The employment of surfactant does not impose any particular limitation on the crystallization conditions such as temperature and concentration of acrylamide, as compared with those in prior art. Whilst the crystallization conditions are fixed by taking into consideration the method for crystallization, the structure and scale of apparatus employed for crystallization and the like, normally a temperature in the range 0°–50° C and a concentration of acrylamide in the range 30–400 g per 100 g of water are employed according to the invention.

The method according to the invention provides acrylamide crystals having clean faces, which are of rather large size and approximately cubic. This characteristic feature affords commercial advantages as follows.

In the first place, as the crystals provided by the invention are difficult to break when subjected to impact in the course of steps subsequent to crystallization, concretion of crystals during storage or transportation is reduced to a great extent.

Secondly, removal of mother liquor from the crystals is rendered easy to facilitate filtration and drying and to reduce the content of mother liquor with the result that the crystals get rid of impurities whereby improving the quality.

Some examples of the invention are illustrated in which "part" means "part by weight."

In order to determine as to how far the acrylamide crystals tend to concrete during storage, the crystals were examined by the "heaped concretion test" which comprises drying acrylamide crystals at a temperature from 45° to 50° C for 30 minutes, packing 500 kg of the crystals each into a number of cylindrical transport bag which were made of rubber, having a 900 mm diameter and a 900 mm height, and provided on the upper surface in the center with an opening adapted to be tight closed and having a 700 mm diameter, and disposing the bags with the opening closed in two layers in a storage kept at a temperature 20°–30° C and a humidity 80–85 percent for inspection of the crystals contained in bags of the lower layer which was made later on having regard to concretion state.

EXAMPLE 1

An aqueous acrylamide solution was prepared from 900 parts of acrylamide, 200 parts of ammonium sulphate, and 1,000 parts of water. 0.08 parts of sodium cellulose glycolate manufactured and sold by Daiichi Kogyo Seiyaku Co., Ltd. under the trade-name CELLOGEN PR were dissolved into 400 parts of the said solution, which was seeded with acrylamide powder at 19.5° C. The solution was cooled to 17.5° C, and stirred for 1 hour to form a slurry. Crystals filtered off from said slurry possessed a platelike, approximately cubic shape with a 1 mm length and 1 mm lean diameter. The concretion index showed 4.0. The content of mother liquor was 2.0 percent. A heaped concretion test indicated no occurrence of concretion of the crystals upon a 30 days storage.

COMPARATIVE EXAMPLE 2

Acrylamide crystals were prepared by following the same process as Example 1 excepting that no CELLOGEN PR was employed. The crystals were found flaky or in the form of agglomeration of flakes. The concretion index was 10 and the mother liquor content 10 percent.

EXAMPLE 3

An aqueous acrylamide solution composed of 35 percent acrylamide, 12 percent ammonium sulphate, 3 percent nitrilotripropionamide and 50 percent water was used in this example. A quantity of polyoxyethylene alkyl amine (the pH value of a 0.5 percent aqueous solution was about 10.) manufactured and sold by Kao Soap Co., Ltd. under the trade-name LEVENOL A CONC was added to said solution so as to indicate 100 ppm in regard to said solution. The crystallization was effected at 10° C by means of a vacuum crystallizer of the draft tube type with the residence time of approximately 1 hour and supersaturation degree of about 0.1 kg per cubic meter. When steady state was reached the resulting slurry was subjected to filtration for 5 minutes by means of a centrifugal separator to give crystals. The crystals were uniform in size, and took a platelike shape having a length 2–2.5 mm and a mean diameter about 1 mm. The concretion index showed 3.0, and the mother liquor content was 1.8 percent. A heaped concretion test indicated no concretion of the crystals stored for 30 days.

COMPARATIVE EXAMPLE 4

Crystallization was carried out by the same process as Example 3 excepting that no LEVENOL A CONC was employed. The resulting crystals were very small and flaky. A centrifugal filtration effected under the same conditions as Example 3 gave crystals which contained 10 percent mother liquor. The concretion index showed 10.

EXAMPLE 5

An aqueous solution composed of 56 percent acrylamide, 1 percent ammonium sulphate and 43 percent water was prepared. A quantity of the LEVENOL A CONC was added to said solution so as to indicate 200 ppm. Crystallization was carried out by means of the same crystallizer as Example 3 at 5° C with residence time of 2 hours and supersaturation degree of 0.05 kg/m$^3$. When steady state was reached, the resulting slurry was subjected to filtration for 5 minutes by means of a centrifugal separator. The resulting acrylamide crystals were uniform in size, having a platelike shape with a length 2.5–3 and a mean diameter about 1 mm. The concretion index showed 2.0, and the mother liquor content was 1.6 percent. A heaped concretion test indicated no concretion of the crystals stored for 30 days.

EXAMPLE 6

An aqueous acrylamide solution composed of 40 percent acrylamide, 13 percent ammonium sulphate, 1 percent nitrilotripropionamide and 46 percent water was used. A quantity of polyoxyethylene alkyl amide manufactured and sold by Nippon Oils and Fats Co., Ltd. under the trade-name NYMID 200, the pH value of 0.5 percent aqueous solution thereof being about 9, was added to the solution so as to indicate 100 ppm in regard to said solution. Crystallization was effected at 5° C by means of a draft tube type crystallizer with residence time of 2 hours and supersaturation degree of 0.05 kg/m$^3$. The resulting slurry was subjected to filtration for 5 minutes by means of a centrifugal separator to give acrylamide crystals, which were uniform in size, having a prismatic shape with a length 2–3 mm and a mean diameter about 1 mm. The concretion index was 2.5 and the mother liquor content 1.8 percent. A heaped concretion test indicated no concretion of the crystals stored 30 days.

EXAMPLE 7

400 parts of the same aqueous acrylamide solution as example 1 were employed. 0.04 parts of the CELLOGEN PR and 0.04 parts of polyoxyethylene sorbitan mono-oleate manufactured and sold by Kao Soap Co., Ltd. under the trade-name EMASOL 4130 were added to said solution to follow the same process as Example 1. The resulting acrylamide crystals were uniform in size, having a granular shape with a diameter about 1.5 mm. The concretion index showed 1.8, and the mother liquor content was 1.5 percent. A heaped concretion test indicated no occurrence of concretion of crystals stored 30 days.

EXAMPLE 8

An aqueous acrylamide solution containing 38.9 percent acrylamide and 9.0 percent ammonium sulphate was prepared by a process comprising hydrating acrylonitrile in the presence of sulphuric acid serving as catalyst and neutralizing the resulting liquor by use of ammonia to remove the crystallized ammonium sulphate. 400 parts of said aqueous solution were used in this example. 0.05 parts of the CELLOGEN PR and 0.05 parts of polyoxyethylene sorbitan mono-stearate manufactured and sold by Daiichi Kogyo Seiyaku Co., Ltd. under the trade-name SOLGEN TW 60 were added to the solution and cooled to 15° C to obtain acrylamide crystals thereby. The resulting acrylamide crystals assumed a prismatic shape with a length 3 mm and a mean diameter about 1.2 mm. The concretion index was 2.0 and the mother liquor content 1.5 percent. A heaped concretion test indicated no occurrence of concretion of the crystals stored 30 days.

EXAMPLE 9

The same aqueous acrylamide solution as Example 1 was employed. 0.05 parts of the CELLOGEN PR and 0.05 parts of the polypropyleneglycol polyethyleneglycol ether manufactured and sold by Nippon Oils and Fats Co., Ltd. under the trade-name PLONON 204 were added to 400 parts of the said solution to follow the same process as Example 1. The resulting acrylamide crystals were of substantially uniform size with a length 2 mm and a mean diameter about 1 mm, possessing a prismatic or platelike shape much like single crystal. The concretion index showed 3.0, and the mother liquor content was 1.8 percent. No occurrence of concretion of the crystals stored 30 days was confirmed by a heaped concretion test.

EXAMPLE 10

The same aqueous acrylamide solution as example 8 was employed. 0.04 parts of the CELLOGEN PR and 0.04 parts of polyethyleneglycol oleyl ether manufactured and sold by Daiichi Kogyo Seiyaku Co., Ltd. under the trade-name NOIGEN ET–120 were added to 400 parts of said solution to follow the process of Example 8. The resulting acrylamide crystals were uniform in size with a length 2 mm and a mean diameter about 1.5 mm, having a prismatic shape with clean faces. The concretion index showed 1.8, and the mother liquor content was 1.3 percent. No concretion of the crystals stored 30 days was confirmed by a heaped concretion test.

COMPARATIVE EXAMPLE 11

Acrylamide crystals were prepared by following the same process as Example 10 without employment of the CELLOGEN PR and NOIGEN ET–120. The resulting acrylamide crystals were found flaky, having a concretion index of 10. The mother liquor content was 10 percent. A heaped concretion test indicated complete concretion of the crystals stored 2 days.

COMPARATIVE EXAMPLE 12

The same process as example 10 was followed by employing 0.08 parts of the NOIGEN ET–120 in place of 0.04 parts of the CELLOGEN PR and 0.04 parts of the NOIGEN ET–120. The resulting acrylamide crystals possessed a prismatic shape with a length 3–4 mm and a mean diameter about 1 mm.

Heaped concretion tests indicated occurrence of two lumps having a diameter about 40 cm in 17 days of storage, and substantially complete concretion in 30 days of storage.

EXAMPLE 13

0.04 parts of the CELLOGEN PR and 0.04 parts of polyoxyethylene oleyl ether manufactured and sold by Nippon Oils and Fats Co., Ltd. under the trade-name NONION E–220 were added to 400 parts of aqueous 55 percent acrylamide solution to follow the same process as Example 1. The resulting acrylamide crystals had a prismatic shape with clean faces and were uniform in size with a length approximately 1.5 mm and a mean diameter 1 mm. The concretion index showed 3.3, and the mother liquor content was 2.0 percent. A heaped concretion test indicated no concretion of the crystals stored 30 days.

COMPARATIVE EXAMPLE 14

Acrylamide crystals were prepared by following the same process as example 13 without employing the CELLOGEN PR and NONION E–220. The resulting acrylamide crystals were flaky, having concretion index of 10 and mother liquor content of 10 percent.

EXAMPLE 15

0.04 parts of the CELLOGEN PR and 0.04 parts of polyethyleneglycol mono-stearate manufactured and sold by Nippon Oils and Fats Co., Ltd. under the trade-name NONION S–10 were added to 400 parts of the aqueous acrylamide solution of Example 1, and the process of Example 1 was followed. The resulting acrylamide crystals having a prismatic shape were uniform in size with a length 2–2.5 mm and a mean diameter approximately 1 mm. The concretion index showed 2.5, and the mother liquor content was 1.8 percent. A heaped concretion test indicated no concretion of the crystals stored 30 days.

EXAMPLE 16

The same aqueous acrylamide solution as example 1 was employed. 0.04 parts of the CELLOGEN PR and 0.04 parts of polypropyleneglycol manufactured and sold by Daiichi Kogyo Seiyaku Co., Ltd. under the trade-name ANTIFROTH F102 were added to 400 parts of the said solution to follow the same process as Example 1. The resulting acrylamide crystals were of substantially uniform size with a length 1.5 mm and a mean diameter about 1.5 mm, possessing a platelike shape. The concretion index showed 1.8, and the mother liquor content was 1.5 percent. A heaped concretion test indicated no concretion of the crystals stored 30 days.

Various modes of carrying out the invention are contemplated as being within the scope of the following claims particularly pointing out and distinctly claiming the subject matter which is regarded as the invention.

We claim:

1. A method for the production of acrylamide crystals, characterized in preparing acrylamide crystals from an aqueous acrylamide solution, which contains at least one surfactant selected from the group consisting of a cellulose glycolic acid salt and polyoxyethylene alkyl amine and polyoxyethylene alkyl amide surfactants.

2. A method as claimed in claim 1, further characterized in that the aqueous acrylamide solution contains, in combination, a cellulose glycolic acid salt and at least one member selected from the group consisting of polyoxyethylene sorbitan alkyl ester, polyoxyethylene alkyl ester, polyoxyethylene alkyl ether, polypropyleneglycol polyethyleneglycol ether, and polypropyleneglycol surfactants.

3. A method for the production of acrylamide crystals, characterized in crystallizing acrylamide out of an aqueous medium containing a polyoxyethylene alkyl amine surfactant with a concentration from 5 to 1,000 ppm.

4. A method for the production of acrylamide crystals, characterized in crystallizing acrylamide out of an aqueous medium containing a cellulose glycolic acid salt and polyoxyethylene alkyl ether surfactant with a concentration from 5 to 1,000 ppm, respectively.

5. A method for the production of acrylamide crystals, characterized in crystallizing acrylamide out of an aqueous medium containing a cellulose glycolic acid salt and polyoxyethylene sorbitan alkyl ester surfactant with a concentration from 5 to 1,000 ppm, respectively.

6. A method as claimed in claim 1, in which the concentration of the surfactant is in the range 5–1,000 ppm.

7. A method as claimed in claim 2 in which the respective concentrations of two or more surfactants, including cellulose glycolic acid salt contained in the aqueous acrylamide solution are in the range 5–1,000 ppm.

* * * * *